US010145726B2

(12) United States Patent
Wang et al.

(10) Patent No.: US 10,145,726 B2
(45) Date of Patent: Dec. 4, 2018

(54) FIBER OPTIC ACOUSTIC WAVE DETECTION SYSTEM

(71) Applicant: Laser Institute of Shandong Academy of Science, Ji'ning, Shandong (CN)

(72) Inventors: Chen Wang, Ji'nan (CN); Ying Shang, Ji'nan (CN); Xiaohui Liu, Ji'nan (CN); Wen'an Zhao, Ji'nan (CN); Long Ma, Ji'nan (CN); Chang Li, Ji'nan (CN); Bing Cao, Ji'nan (CN); Jiasheng Ni, Ji'nan (CN); Chang Wang, Ji'nan (CN)

(73) Assignee: Laser Institute of Shandong Academy of Science, Jining (CN)

( * ) Notice: Subject to any disclaimer, the term of this patent is extended or adjusted under 35 U.S.C. 154(b) by 155 days.

(21) Appl. No.: 15/428,630

(22) Filed: Feb. 9, 2017

(65) Prior Publication Data

US 2018/0143067 A1 May 24, 2018

(30) Foreign Application Priority Data

Nov. 23, 2016 (CN) .......................... 2016 1 1036410

(51) Int. Cl.
*G01H 9/00* (2006.01)
(52) U.S. Cl.
CPC .................... *G01H 9/004* (2013.01)
(58) Field of Classification Search
CPC ................ G01H 9/004; G01D 5/35358
See application file for complete search history.

(56) References Cited

U.S. PATENT DOCUMENTS

| 2017/0082481 A1* | 3/2017 | Kageyama | ............. | B65G 27/04 |
| 2017/0138785 A1* | 5/2017 | Tadakuma | ............. | G01D 5/353 |
| 2018/0045543 A1* | 2/2018 | Farhadiroushan | ..... | G01H 9/004 |

* cited by examiner

*Primary Examiner* — Tony Ko
(74) *Attorney, Agent, or Firm* — Renaissance IP Law Group, LLP; David A. Crowther

(57) ABSTRACT

Provided is a fiber optic acoustic wave detection system, pertaining to the fiber optic sensing technical field. The system comprises a power output apparatus, a backward Rayleigh scattering principle-based first distributed sensing apparatus, a backward weak optical fiber grating reflection principle-based second distributed sensing apparatus, and a third distributed sensing apparatus. The first distributed sensing apparatus and the second distributed sensing apparatus are connected with the power output apparatus, respectively. The first distributed sensing apparatus and the second distributed sensing apparatus are connected with the third distributed sensing apparatus, respectively. Compared with conventional approaches, the signal contrast and sensitivity of the detection system are greatly improved by combining the backward Rayleigh scattered signal in the first distributed sensing apparatus with the backward weak optical fiber grating reflected signal in the second distributed sensing apparatus, and the detection system detection bandwidth is significantly widened by the third distributed sensing apparatus.

10 Claims, 8 Drawing Sheets

FIBER OPTIC ACOUSTIC WAVE DETECTION SYSTEM

RELATED APPLICATION DATA

This application claims priority under 35 USC § 119 to Chinese Patent Application No. 201611036410.7, filed on Nov. 23, 2016 in the State Intellectual Property Office (SIPO) of the People's Republic of China, the contents of which are herein incorporated by reference in their entirety.

TECHNICAL FIELD

Embodiments of the present invention relate to the technical field of fiber optic sensing, and in particular, to a fiber optic acoustic wave detection system.

BACKGROUND

Fiber optic distributed acoustic wave detection technology is currently the most advanced fiber optic sound field recovery technology, which uses measured acoustic wave as a function of the length of an optical fiber, and can continuously measure acoustic wave information distributed along a geometric path of the optical fiber over the entire length of the optical fiber, provide means of obtaining both the spatial distribution state and time-varying information of the measured physical parameter for the industrial and research fields, and has been widely applied to the fields of smart aircrafts, smart bridges, expressways, important buildings, gas pipeline monitoring and optical cable monitoring and so on.

Currently, the fiber optic distributed acoustic wave sensing technology includes an optical fiber grating quasi-distributed sensing technology and an optical time domain reflection technology. The optical fiber grating quasi-distributed sensing technology realizes the distributed monitoring of an acoustic wave by using the reflection effect of an optical fiber grating, wherein wavelength change information of the optical fiber grating is used mainly, but traditional cascaded optical fiber gratings have low capacity and multiplexing rate. The optical time domain reflection technology performs measurement mainly using the effects, for example, Rayleigh and Brillouin effects produced by the acoustic wave disturbance of the optical fiber, but the energy of the scattered signal is very weak, which causes lower technical indexes, such as detection distance and spatial resolution, etc.

SUMMARY

Embodiments of the present invention provide a fiber optic acoustic wave detection system, to effectively improve the above-mentioned problems. The embodiments of the present invention provide the following technical solutions.

In a first aspect, an embodiment of the present invention provides a fiber optic acoustic wave detection system, comprising a power output apparatus, a first distributed sensing apparatus based on a backward Rayleigh scattering principle, a second distributed sensing apparatus based on a backward weak optical fiber grating reflection principle, and a third distributed sensing apparatus, wherein the first distributed sensing apparatus and the second distributed sensing apparatus are connected with the power output apparatus respectively, the first distributed sensing apparatus and the second distributed sensing apparatus are connected with the third distributed sensing apparatus respectively, a pulse signal outputted by the power output apparatus enters the first distributed sensing apparatus and is partly returned to form a backward Rayleigh scattered signal and outputted by the first distributed sensing apparatus, and partly passes through to form a first forward pulse signal, a pulse signal outputted by the power output apparatus enters the second distributed sensing apparatus and is partly returned to form a backward weak optical fiber grating reflected signal and outputted by the second distributed sensing apparatus, and partly passes through to form a second forward pulse signal, the first forward pulse signal and the second forward pulse signal pass through the third distributed sensing apparatus to form a third detection signal, and the third detection signal is outputted by the third distributed sensing apparatus.

In some embodiments of the present invention, the power output apparatus includes a laser, an acousto-optic modulator, a first optical amplifier, a first optical filter and a first coupler, wherein the first distributed sensing apparatus and the second distributed sensing apparatus are optically coupled with the first coupler respectively, and an optical signal outputted by the laser successively passes through the acousto-optic modulator and the first optical amplifier and is outputted through the first coupler to the first distributed sensing apparatus and the second distributed sensing apparatus, respectively.

In some embodiments of the present invention, the first distributed sensing apparatus includes a first detection optical fiber, a first circulator, a second optical amplifier and a first photoelectrical detector, wherein the pulse signal outputted by the power output apparatus enters the first detection optical fiber via the first circulator, and is partly returned to form the backward Rayleigh scattered signal and partly passes through to form the first forward pulse signal, the backward Rayleigh scattered signal successively passes through the first circulator and the second optical amplifier and is received and outputted by the first photoelectric detector, and the first forward pulse signal is outputted to the third distributed sensing apparatus.

In some embodiments of the present invention, the second distributed sensing apparatus includes a second detection optical fiber, a second circulator, a second optical filter and a second photoelectric detector, wherein the pulse signal outputted by the power output apparatus enters the second detection optical fiber via the second circulator and is partly returned to form the backward weak optical fiber grating reflected signal and partly passes through to form the second forward pulse signal, the backward weak optical fiber grating reflected signal successively passes through the second circulator and the second optical filter and is received and outputted by the second photoelectric detector, and the second forward pulse signal is outputted to the third distributed sensing apparatus.

In some embodiments of the present invention, the third distributed sensing apparatus includes a second coupler, a third optical filter, a third circulator, an optical fiber interference device and a photoelectric detection device, wherein the first distributed sensing apparatus and the second distributed sensing apparatus are optically coupled with the second coupler respectively, the first forward pulse signal outputted by the first distributed sensing apparatus and the second forward pulse signal outputted by the second distributed sensing apparatus successively pass through the third optical filter and the third circulator via the second coupler, enter the optical fiber interference device and is partly returned to form the third detection signal, and the third detection signal is received and outputted by the photoelectric detection device.

In some embodiments of the present invention, the optical fiber interference device includes a 3×3 coupler, a first Faraday rotating mirror and a second Faraday rotating mirror, the photoelectric detection device includes a third photoelectric detector, a fourth photoelectric detector and a fifth photoelectric detector, the first forward pulse signal and the second forward pulse signal, which have passed through the third circulator, enter the 3×3 coupler, and is partly outputted by the 3×3 coupler and reflected back by the first Faraday rotating mirror into the 3×3 coupler, and partly outputted by the 3×3 coupler and reflected back by the second Faraday rotating mirror into the 3×3 coupler, to form the third detection signal in the 3×3 coupler, and the third detection signal is outputted by the 3×3 coupler, and partly passes through the third circulator and is received and outputted by the third photoelectric detector and, is partly received and outputted by the fourth photoelectric detector, and is partly received and outputted by the fifth photoelectric detector.

In some embodiments of the present invention, the optical fiber interference device includes a 2×2 coupler, a third Faraday rotating mirror, a fourth Faraday rotating mirror and a phase modulator, the photoelectric detection device includes a sixth photoelectric detector, the first forward pulse signal and the second forward pulse signal, which have passed through the third circulator, enter the 2×2 coupler, and is partly outputted by the 2×2 coupler and reflected back by the third Faraday rotating mirror into the 2×2 coupler, and partly is outputted by the 2×2 coupler, passes through the phase modulator, and is reflected by the fourth Faraday rotating mirror, and then returned back through the phase modulator into the 2×2 coupler to form the third detection signal in the 2×2 coupler, and the third detection signal is outputted by the 2×2 coupler and received and outputted by the sixth photoelectric detector.

In some embodiments of the present invention, the first detection optical fiber is a single-mode optical fiber.

In some embodiments of the present invention, the second detection optical fiber is a single-mode optical fiber comprising at least one weak optical fiber grating.

In a second aspect, an embodiment of the present invention also provides a fiber optic acoustic wave detection system, comprising a power output apparatus, a first distributed sensing apparatus, a second distributed sensing apparatus, a third distributed sensing apparatus and a fiber optic signal demodulation system, wherein the first distributed sensing apparatus and the second distributed sensing apparatus are connected with the power output apparatus respectively, the first distributed sensing apparatus and the second distributed sensing apparatus are connected with the third distributed sensing apparatus respectively, the first distributed sensing apparatus, the second distributed sensing apparatus and the third distributed sensing apparatus are connected with the fiber optic signal demodulation system respectively, a pulse signal outputted by the power output apparatus enters the first distributed sensing apparatus and is partly returned to form a backward Rayleigh scattered signal and outputted from the first distributed sensing apparatus to the fiber optic signal demodulation system, and partly passes through to form a first forward pulse signal, a pulse signal outputted by the power output apparatus enters the second distributed sensing apparatus, and is partly returned to form a backward weak optical fiber grating reflected signal and outputted from the second distributed sensing apparatus to the fiber optic signal demodulation system, and partly passes through to form a second forward pulse signal, the first forward pulse signal and the second forward pulse signal pass through the third distributed sensing apparatus to form a third detection signal, and the third detection signal is outputted from the third distributed sensing apparatus to the fiber optic signal demodulation system.

The fiber optic acoustic wave detection system provided by the embodiments of the present invention acquires a backward Rayleigh scattered signal carrying the position information of the acoustic wave in the measured space, i.e., the backward Rayleigh scattered signal by the first distributed sensing apparatus, acquires a backward weak grating reflected signal carrying light intensity information and acoustic wave phase information at a specific position in the measured space, i.e., the backward weak optical fiber grating reflected signal by the second distributed sensing apparatus, and then performs a normalized demodulation scheme on the backward Rayleigh scattered signal and the backward weak optical fiber grating reflected signal acquired by the fiber optic signal demodulation system, greatly improving the signal contrast and sensitivity of the whole fiber optic acoustic wave detection system. Meanwhile, the first forward pulse signal emitted from the first distributed sensing apparatus and the second forward pulse signal emitted from the second distributed sensing apparatus are subjected to a passive phase demodulation scheme by the third distributed sensing apparatus, which significantly widens the detection bandwidth of the system. Compared with the prior art, the fiber optic acoustic wave detection system provided by the embodiments of the present invention has high capacity and multiplexing rate, and high technical indexes such as detection distance, spatial resolution and so on, and has a detection principle requiring no time-division multiplexing technology, thus greatly reducing the number of the required prior single acoustic wave phase sensors under the premise of not increasing the length of the sensing optical fiber, reducing the complexity of the system and the technical difficulty in the implementation of the system, and greatly reducing the system cost.

BRIEF DESCRIPTION OF THE DRAWINGS

In order to explain the technical solutions of the embodiments of the present invention more clearly, the following drawings will be introduced briefly below. The drawings described below are merely illustrative of some embodiments of the present invention, and are therefore not to be considered limiting its scope, and it would be understood by those skilled in the art that other relevant drawings could be derived from these drawings without using any inventive effort.

Figure 1:
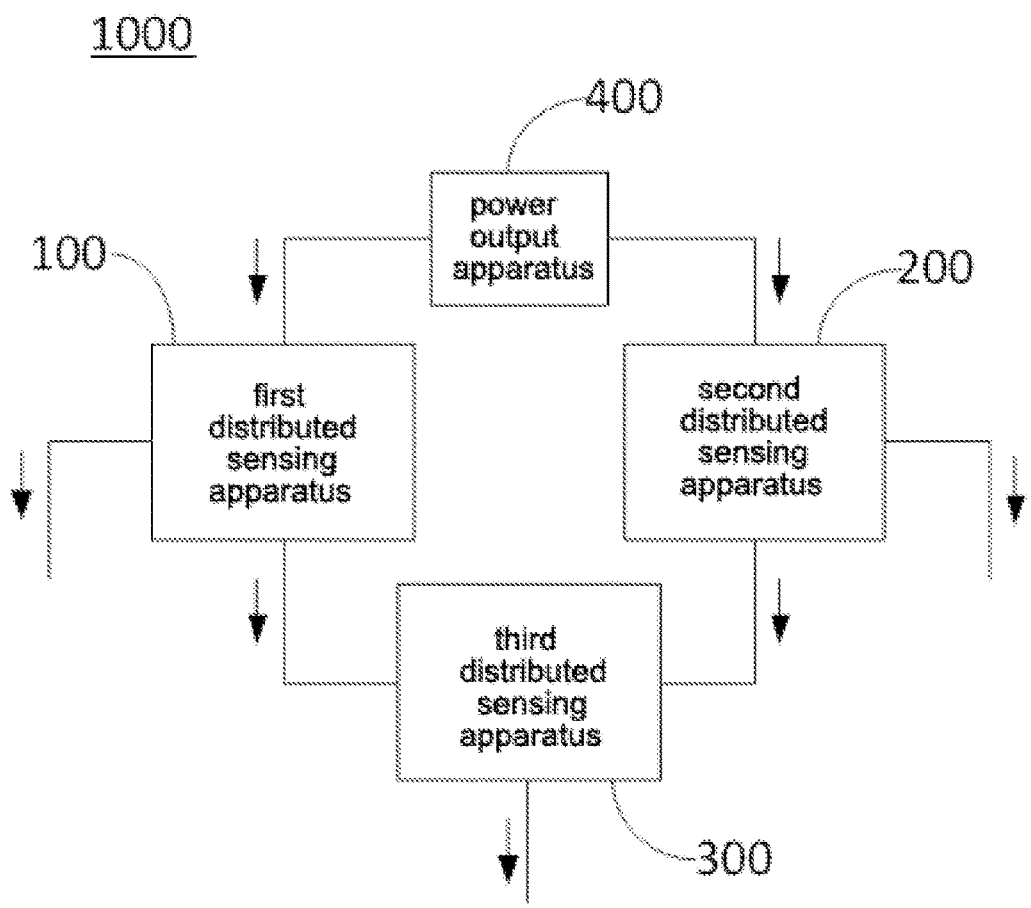
FIG. 1 is a schematic view of a fiber optic acoustic wave detection system provided by an embodiment of the present invention.

Reference numerals: 100—first distributed sensing apparatus; 200—second distributed sensing apparatus; 300—third distributed sensing apparatus; 400—power output apparatus; 500—fiber optic signal demodulation system; 1000—fiber optic acoustic wave detection system.

DETAILED DESCRIPTION OF THE EMBODIMENTS

In order to make the technical solutions and advantages of the embodiments of the present invention more clear, the technical solutions of the embodiments of the present invention will be described below clearly and completely with reference to the drawings of the embodiments of the present invention. It is apparent that the described embodiments are some, but not all of the embodiments of the present invention. Generally, the components of the embodiments of the present invention described and illustrated in the figures herein may be arranged and designed in a wide variety of different configurations.

Thus, the following detailed description of the embodiments of the present invention, as represented in the figures, is not intended to limit the scope of the present invention as claimed, but is merely representative of the selected embodiments of the present invention. All the other embodiments obtained by those skilled in the art based on the embodiments of the present invention without using inventive efforts will fall within the protection scope of the present invention.

It should be noted that the similar reference numerals and letters refer to the similar items in the following figures, and thus once an item is defined in one figure, it does not need to be further defined or explained in the following figures.

In the description of the present invention, it should be indicated that orientation or positional relations indicated by the terms such as "center," "up," "down," "left," "right," "vertical," "horizontal," "inner," and "outer" are based on the orientation or position relations as shown in the drawings, or the orientation or position relations in which the inventive product is conventionally placed in use, and these terms are only intended to facilitate the description of the present invention and simplify the description, but not to indicate or imply that the referred devices or elements must be in a particular orientation, or constructed or operated in the particular orientation, and therefore it should not be construed as limiting the present invention. In addition, the terms such as "first," "second," and "third" are used only for distinguishing the description, and should not be understood as indicating or implying to have importance in relativity.

In addition, the terms such as "horizontal," "vertical," and "suspended," etc. do not mean that the components are required to be absolutely horizontal or suspended, and they may be slightly inclined. For example, the term "horizontal" refers only to the fact that its direction is more horizontal than "vertical," and it does not mean that the structure must be completely horizontal, and it may be slightly inclined.

In the description of the present invention, it should also be indicated that unless otherwise expressly specified or defined, the terms "disposed," "mounted," "coupled," and "connected" should be understood broadly. For example, the connection may be fixed connection, detachable connection, or integral connection, or may be mechanical connection or electrical connection, or may be direct connection or indirect connection via an intermediate medium, or may be internal communication between two elements. The specific meanings of the above-mentioned terms in the present invention could be understood by those skilled in the art according to specific situations.

Moreover, the terms "output," "pass through," "go through," "return," "form," etc. should be understood as describing an optical or electrical change, or optical or electrical processing. For example, the term "go through" refers only to the fact that an optical or electrical signal is optically or electrically changed after passing through the device, instrument, or apparatus, such that the optical signal or the electrical signal is processed to further obtain a signal required for carrying out the technical solution or solving the technical problem.

In order to better and more clearly describe the operation principles of the respective devices, instruments and apparatuses in the fiber optic acoustic wave detection system, and express the transit logic of an optical signal and an electrical signal in the system, the respective positional relationships between the respective devices, instruments and apparatuses are merely distinguished clearly in the drawings of specific embodiments of the present invention, which, however, cannot be considered as limiting the direction of the optical path or the circuit, and the size, dimension and shape of the device or instrument.

Referring to FIG. 1, an embodiment of the present invention provides a fiber optic acoustic wave detection system 1000, which comprises a first distributed sensing apparatus 100, a second distributed sensing apparatus 200, a third distributed sensing apparatus 300, and a power output apparatus 400. The first distributed sensing apparatus 100 and the second distributed sensing apparatus 200 are connected with the power output apparatus 400 respectively, and the first distributed sensing apparatus 100 and the second distributed sensing apparatus 200 are also connected with the third distributed sensing apparatus 300 respectively.

A pulse signal outputted by the power output apparatus 400 enters the first distributed sensing apparatus 100. The pulse signal entering the first distributed sensing apparatus 100 is partly returned by the first distributed sensing apparatus 100 to form a backward Rayleigh scattered signal, outputted by the first distributed sensing apparatus 100, and partly passes forwardly through the first distributed sensing apparatus 100 to form a first forward pulse signal. A pulse signal outputted by the power output apparatus 400 enters the second distributed sensing apparatus 200. The pulse signal entering the second distributed sensing apparatus 200 is partly returned by the second distributed sensing apparatus 200 to form a backward weak optical fiber grating reflected signal, outputted by the second distributed sensing apparatus 200, and partly passes forwardly through the second distributed sensing apparatus 200 to form a second forward pulse signal. The first forward pulse signal and the second forward pulse signal enter the third distributed sensing apparatus 300 and are processed by the third distributed sensing apparatus 300 to form a third detection signal. The third detection signal is outputted by the third distributed sensing apparatus 300.

In the present embodiment, the backward Rayleigh scattered signal may be a backward Rayleigh scattered signal carrying position information of an acoustic wave in the measured space. The backward weak optical fiber grating reflected signal may be a backward weak grating reflected signal carrying light intensity information and acoustic wave phase information at a specific position in the measured space. The backward Rayleigh scattered signal and the backward weak optical fiber grating reflected signal may be outputted to a photoelectric detection device or a fiber optic signal demodulation system. A normalized demodulation scheme is used to obtain the position and phase information of the acoustic wave in the measured space. The first forward pulse signal and the second forward pulse signal interfere in the third distributed sensing apparatus 300. The third detection signal carrying an interference signal is outputted to the photoelectric detection device or the fiber optic signal demodulation system, and information on the sound field environment in the measured space may be obtained by using a corresponding passive phase demodulation scheme.

Figure 2:
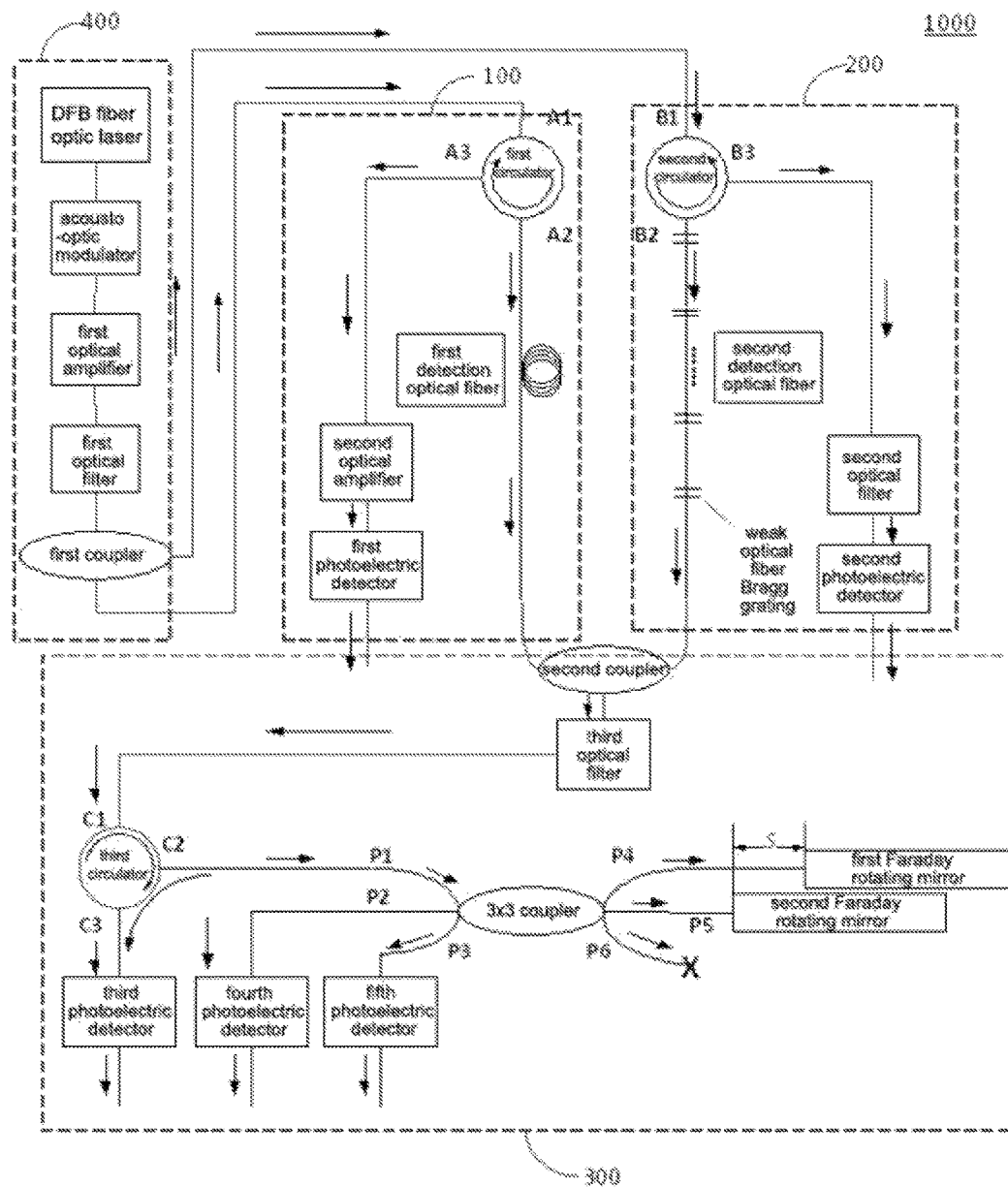
FIG. 2 is a schematic view of a fiber optic acoustic wave detection system provided by a first embodiment of the present invention.

Referring to FIG. 2, the present embodiment provides a fiber optic acoustic wave detection system 1000, which comprises a first distributed sensing apparatus 100, a second distributed sensing apparatus 200, a third distributed sensing apparatus 300, and a power output apparatus 400. The first distributed sensing apparatus 100 and the second distributed sensing apparatus 200 are connected with the power output apparatus 400 respectively. The first distributed sensing apparatus 100 and the second distributed sensing apparatus 200 are connected with the third distributed sensing apparatus 300, respectively.

Figure 3:
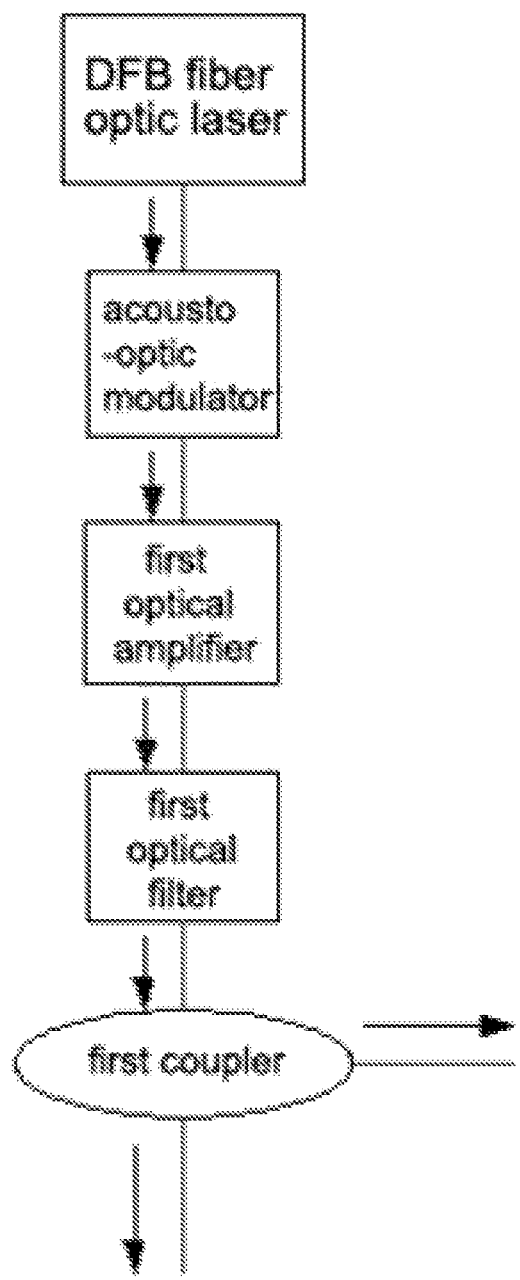
FIG. 3 is a schematic view of a power output apparatus provided by the first embodiment of the present invention.

Referring to FIG. 3, the power output apparatus 400 includes a laser, an acousto-optic modulator, a first optical amplifier, a first optical filter, and a first coupler. The first distributed sensing apparatus 100 and the second distributed sensing apparatus 200 are optically coupled with the first coupler, respectively. In the present embodiment, the laser may be a distributed feedback (DFB) fiber optic laser (hereinafter referred simply to as the "DFB fiber optic laser"). A continuous forward incident optical signal, outputted by the DFB fiber optic laser, is modulated into a forward pulse signal having a certain pulse width and period by the acousto-optic modulator, then amplified by the first optical amplifier, and outputted to the first distributed sensing apparatus 100 and the second distributed sensing apparatus 200 through the first coupler, respectively.

Figure 4:
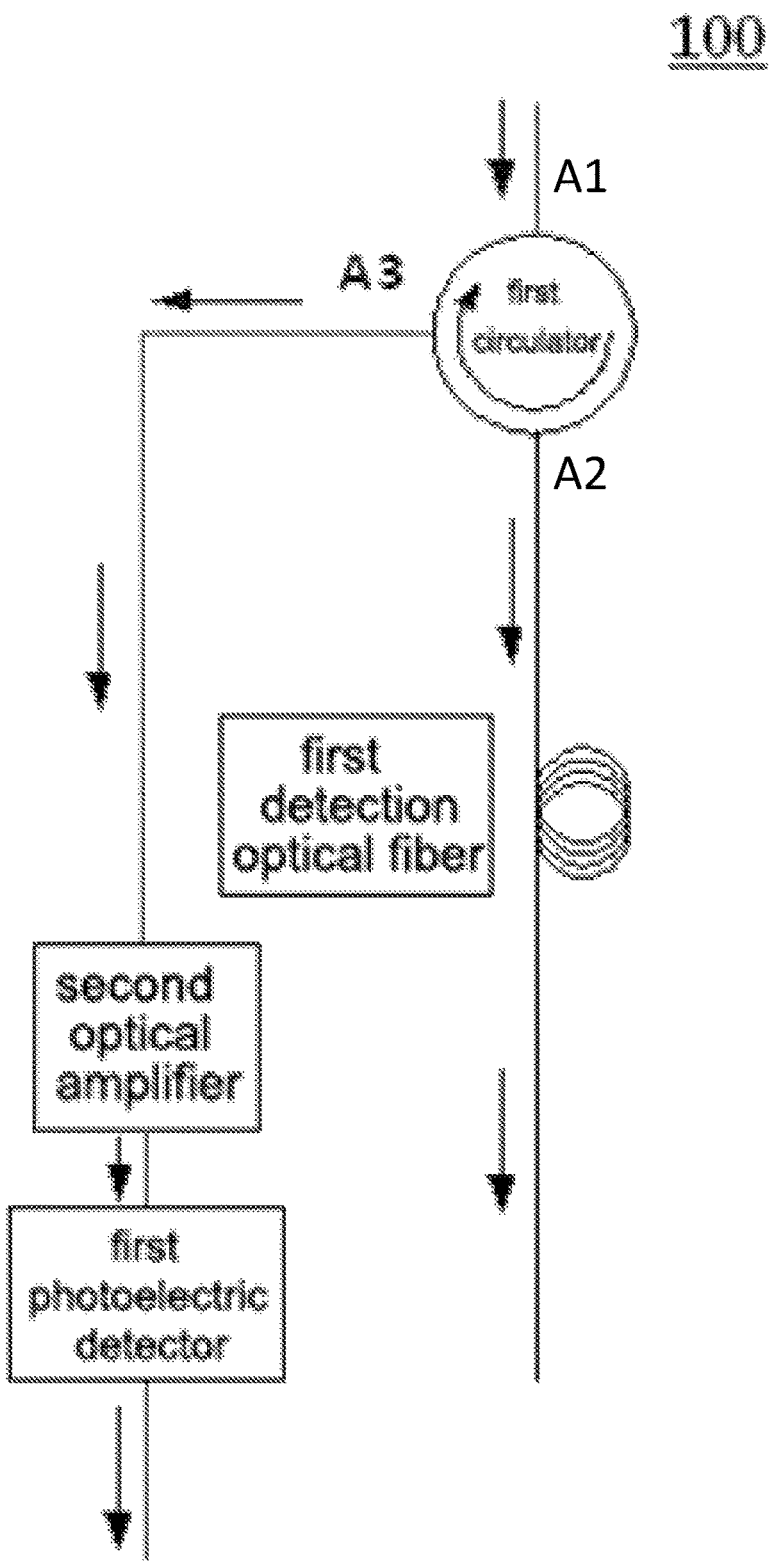
FIG. 4 is a schematic view of a first distributed sensing apparatus provided by the first embodiment of the present invention.

Referring to FIG. 4, the first distributed sensing apparatus 100 includes a first detection optical fiber, a first circulator, a second optical amplifier, and a first photoelectric detector. The forward incident optical pulse signal outputted by the DFB fiber optic laser enters an A1 port of the first circulator through the first coupler, and is emitted from an A2 port and enters the first detection optical fiber. In the present embodiment, the first detection optical fiber may be a common single-mode optical fiber, and since an optical signal may generate non-erasable Rayleigh scattering in a single-mode optical fiber. A part of the backward Rayleigh scattered signal carrying position information of the acoustic wave in the measured space is returned to the A2 port of the first circulator from the inside of the first detection optical fiber and outputted from an A3 port of the first circulator, passes through the second optical amplifier and is received and outputted by the first photoelectric detector. The part, which is emitted forwardly from the first detection optical fiber, forms a first forward pulse signal and enters the third distributed sensing apparatus 300.

It will be appreciated herein that the circulator in the present embodiment is a multi-port device, through which a signal can be transmitted only in a form of unidirectional loop. For example, the signal inputted from the A1 port of the first circulator can be outputted only from the A2 port of this circulator; and the signal inputted from the A2 port of this circulator can be outputted only from the A3 port of this circulator. In this way, the signals carrying different information and thus having different directions are separated.

Figure 5:
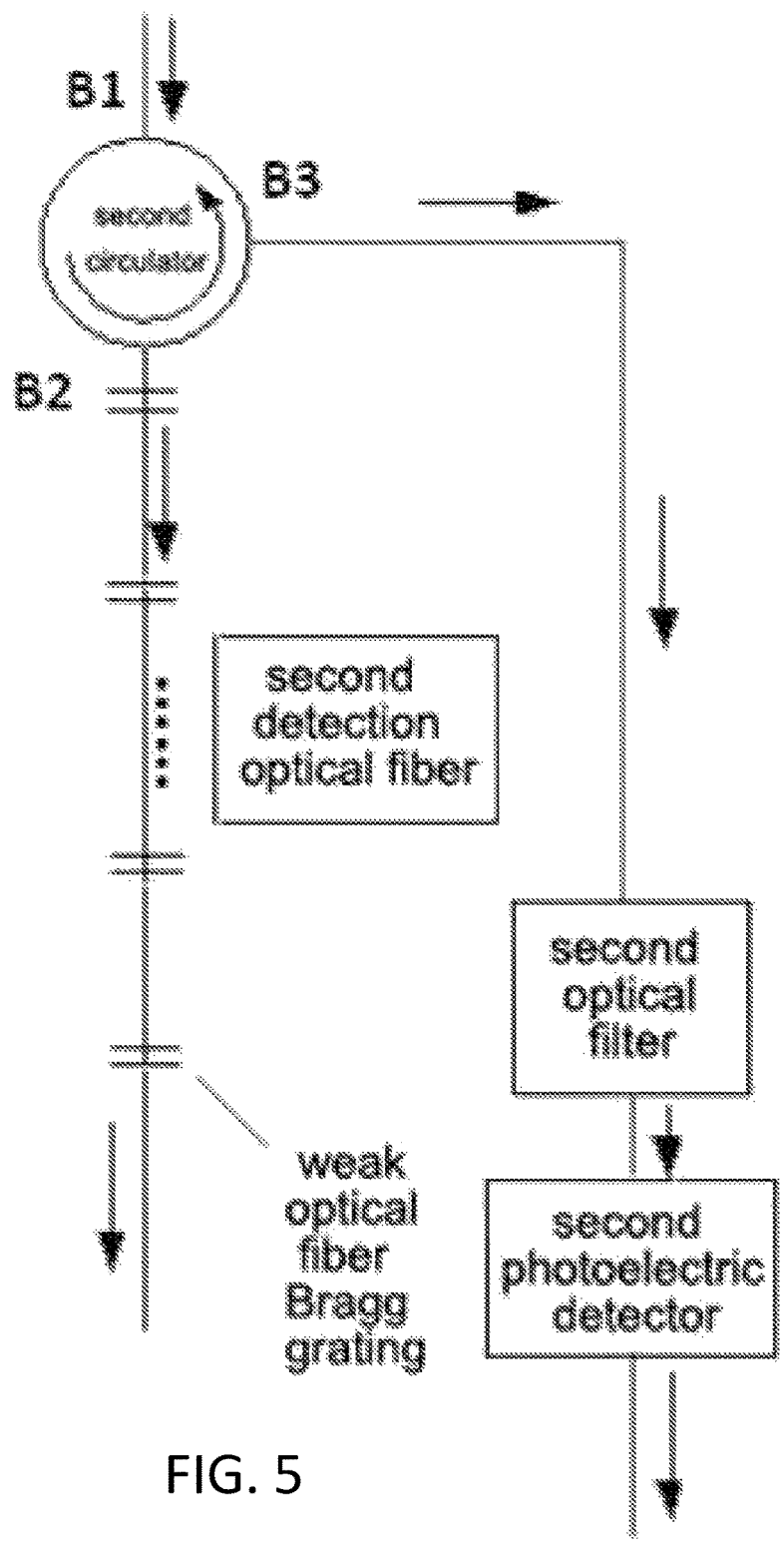
FIG. 5 is a schematic view of a second distributed sensing apparatus provided by first embodiment of the present invention.

Referring to FIG. 5, the second distributed sensing apparatus 200 includes a second detection optical fiber, a second circulator, a second optical filter, and a second photoelectric detector. The forward incident optical pulse signal outputted by the DFB fiber optic laser enters a B1 port of the second circulator through the first coupler, and is emitted from a B2 port to enter the second detection optical fiber. In the present embodiment, the second detection optical fiber may be a single-mode optical fiber comprising at least one weak optical fiber grating (e.g., weak optical fiber Bragg grating), with the reflectivity of the optical fiber grating being preferably less than 10%, and since the optical signal is partially reflected every time passing through one grating, the optical signal which has passed through the weak optical fiber grating carries light intensity information at a specific position in the measured space, that is, at a sensing optical fiber between individual optical fiber gratings.

A part of the optical signal reflected by the optical fiber grating is returned to the B2 port of the second circulator and outputted from a B3 port of the second circulator, passes through the second optical filter and is received and outputted by the second photoelectric detector. The part, which is emitted forwardly from the second detection optical fiber, forms a second forward pulse signal and enters the third distributed sensing apparatus 300. In the present embodiment, the spacing between individual optical fiber gratings in the second detection optical fiber may be very small, and the light intensity information at the sensing optical fiber between individual optical fiber grating is measured, thereby increasing the spatial resolution of the detection system.

Figure 6:
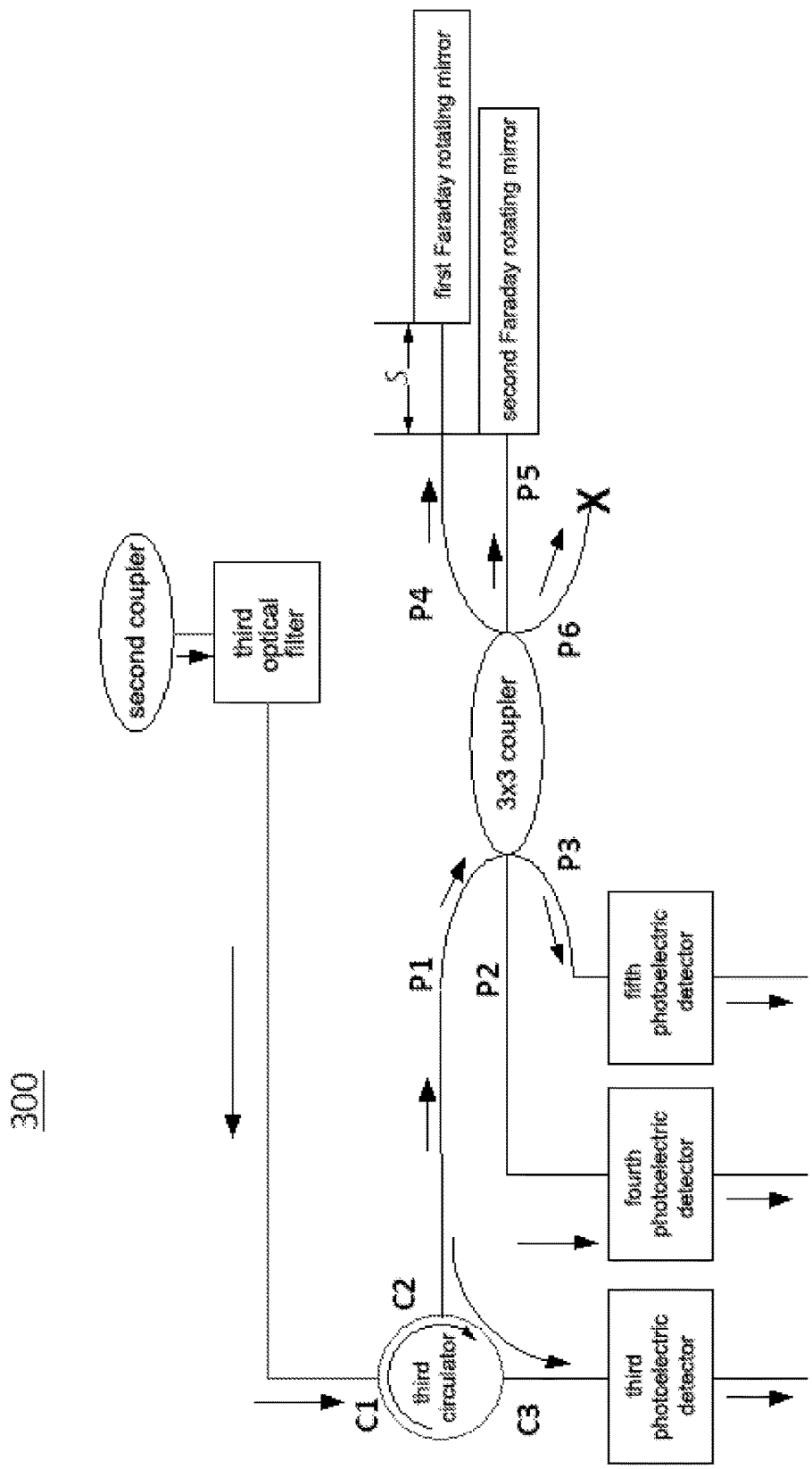
FIG. 6 is a schematic view of a third distributed sensing apparatus provided by the first embodiment of the present invention.

Referring to FIG. 6, the third distributed sensing apparatus 300 includes a second coupler, a third optical filter, a third circulator, a 3×3 coupler, a first Faraday rotating mirror, a second Faraday rotating mirror, a third photoelectric detector, a fourth photoelectric detector, and a fifth photoelectric detector. The first forward pulse signal and the second forward pulse signal are coupled by the second coupler into a forward incident optical signal, which passes through the third optical filter, is inputted from a C1 port of the third circulator, and outputted from a C2 port to a P1 port of the 3×3 coupler. A part of the optical signal entering the 3×3 coupler is outputted from a P4 port to the first Faraday rotating mirror, and reflected back to the P4 port of the 3×3 coupler by the first Faraday rotating mirror. A part of the optical signal is outputted from a P5 port to the second Faraday rotating mirror, and reflected back to the P5 port of the 3×3 coupler by the second Faraday rotating mirror. Also, a small part of the optical signal is outputted from a P6 port to the outside of the system.

In the specific embodiment, the P6 port can be sealed with a reflecting device or light-receiving device. The optical signals modulated by the first Faraday rotating mirror and the second Faraday rotating mirror interfere in the 3×3 coupler, and form an optical signal carrying the phase information of the acoustic wave in the measured space. The interfered optical signal is partly outputted to the C2 port of the third circulator through the P1 port of the 3×3 coupler, outputted from the C3 port, and then received and outputted by the third photoelectric detector. The interfered optical signal is partly outputted from a P2 port of the 3×3 coupler and directly received and outputted by the fourth photoelectric detector. And, the interfered optical signal is partly outputted from the P3 port of the 3×3 coupler and directly received and outputted by the fifth photoelectric detector.

In the present embodiment, the 3×3 coupler, the first Faraday rotating mirror and the second Faraday rotating mirror together constitute a Michelson interferometer as an optical fiber interference device to achieve interference of the forward incident optical signals, i.e., the first forward pulse signal and the second forward pulse signal, entering the device. And, the third photoelectric detector, the fourth photoelectric detector and the fifth photoelectric detector, as a photoelectric detection device, receive the optical signals outputted from the P1, P2 and P3 ports of the 3×3 coupler, respectively. The distance difference S between the distance from the P4 port of the 3×3 coupler to the first Faraday rotating mirror and the distance from the P5 port of the 3×3 coupler to the second Faraday rotating mirror is an integral multiple of the spatial resolution of the system.

The first optical amplifier and the second optical amplifier in the present embodiment may be pulse erbium-doped optical fiber amplifiers, and the output signal from the DFB fiber optic laser may be near-infrared light having a wavelength of 1,550 nm. The signal transmission between individual devices, instruments or apparatuses in the fiber optic acoustic wave detection system 1000 may be performed through optical fibers. The electrical signals outputted by the first photoelectric detector, the second photoelectric detector, the third photoelectric detector, the fourth photoelectric detector and the fifth photoelectric detector may be inputted into an external device of the system—for example, a fiber optic signal demodulation system—to perform corresponding demodulation to obtain the position, frequency and phase information of the acoustic wave, so that the comprehensive detection of the information on the acoustic wave at the specific position in the measured space can be completed.

Figure 7:
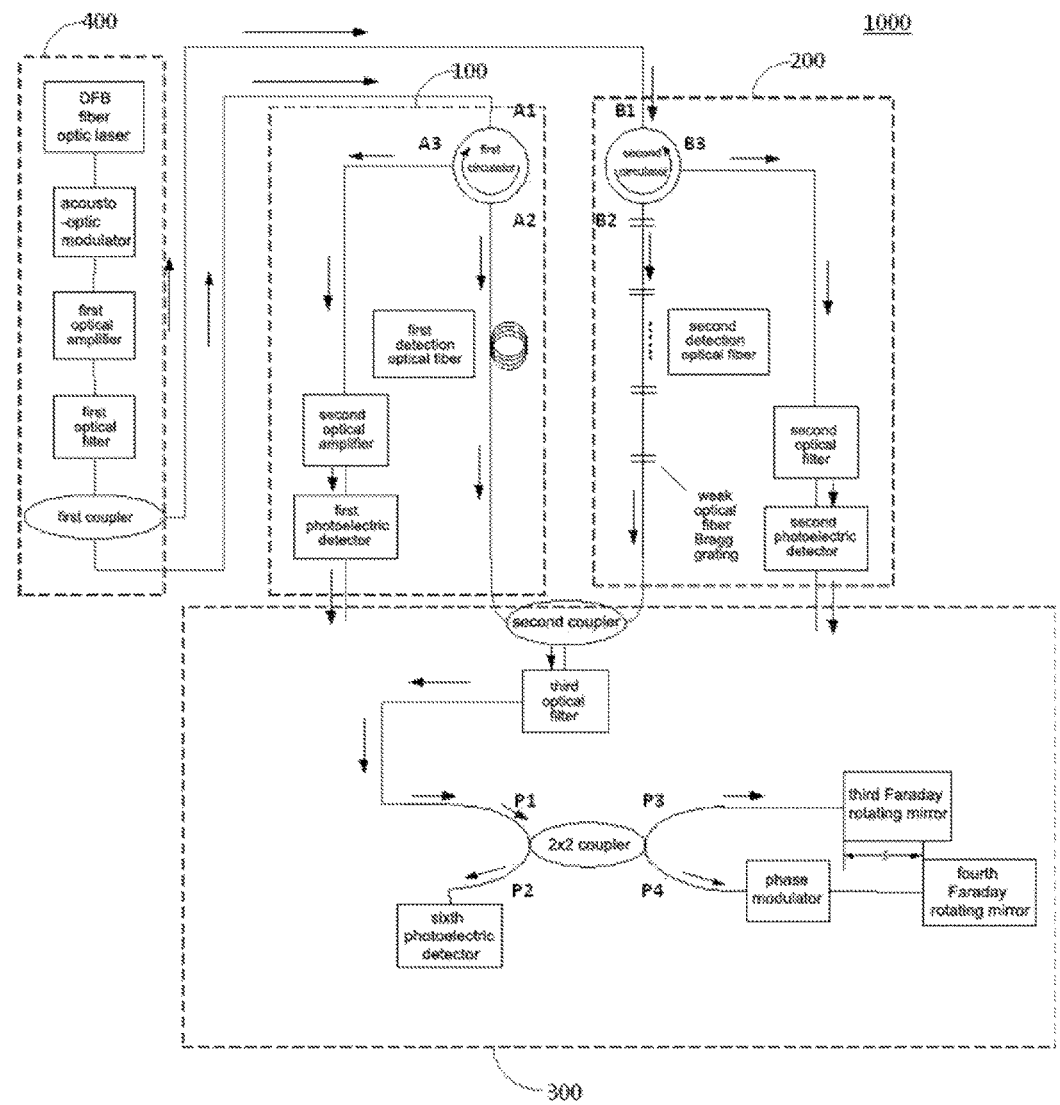
FIG. 7 is a schematic view of a fiber optic acoustic wave detection system provided by a second embodiment of the present invention.

Referring to FIG. 7, the present embodiment provides a fiber optic acoustic wave detection system 1000, which comprises a first distributed sensing apparatus 100, a second distributed sensing apparatus 200, a third distributed sensing apparatus 300, and a power output apparatus 400. The biggest differences from the first embodiment of the present invention are that: (i) the third circulator is omitted in the third distributed sensing apparatus 300, (ii) the 3×3 coupler, the first Faraday rotating mirror and the second Faraday rotating mirror are replaced by a 2×2 coupler, a third Faraday rotating mirror and a fourth Faraday rotating mirror, respectively, (iii) a phase modulator is added between the 2×2 coupler and the fourth Faraday rotating mirror, and (iv) the third photoelectric detector, the fourth photoelectric detector and the fifth photoelectric detector are replaced by a sixth photoelectric detector.

The first forward pulse signal and the second forward pulse signal are coupled by the second coupler into a forward incident optical signal, which passes through the third optical filter and is inputted from a P1 port of the 2×2 coupler. A part of the optical signal entering the 2×2 coupler is outputted from a P3 port to the third Faraday rotating mirror and reflected back to the P3 port of the 2×2 coupler by the third Faraday rotating mirror. And, a part of the optical signal is outputted from a P4 port, emitted into the fourth Faraday rotating mirror through the phase modulator, and reflected back to the P4 port of the 2×2 coupler by the fourth Faraday rotating mirror. The optical signals, subjected to modulation by the third Faraday rotating mirror, the phase modulator and the fourth Faraday rotating mirror, interfere in the 2×2 coupler and form an optical signal carrying phase information of the acoustic wave in the measured space. The interfered optical signal is outputted through the P2 port of the 2×2 coupler and then received and outputted by the sixth photodetector.

In the present embodiment, the 2×2 coupler, the third Faraday rotating mirror, the phase modulator and the fourth Faraday rotating mirror together constitute a Michelson interferometer as an optical fiber interference device, to achieve interference of the forward incident optical signals, i.e., the first forward pulse signal and the second forward pulse signal, entering the device. Moreover, the sixth photoelectric detector receives, as a photoelectric detection device, the optical signal outputted from the P4 port of the 2×2 coupler. The distance difference S between the distance from the P3 port of the 2×2 coupler to the third Faraday rotating mirror and the distance from the P4 port of the 2×2 coupler to the fourth Faraday rotating mirror is an integral multiple of the spatial resolution of the system.

In the present embodiment, an electrical signal outputted by the sixth photoelectric detector may be inputted into an external device of the system—for example, a fiber optic signal demodulation system—to perform phase generated carrier demodulation so that the phase information of the acoustic wave in the measured space can be acquired. As compared with the first embodiment of the present invention, in the present embodiment, the used third distributed sensing apparatus 300 having the 2×2 coupler as a core can also carry out the same function and has a simpler system structure.

Figure 8:
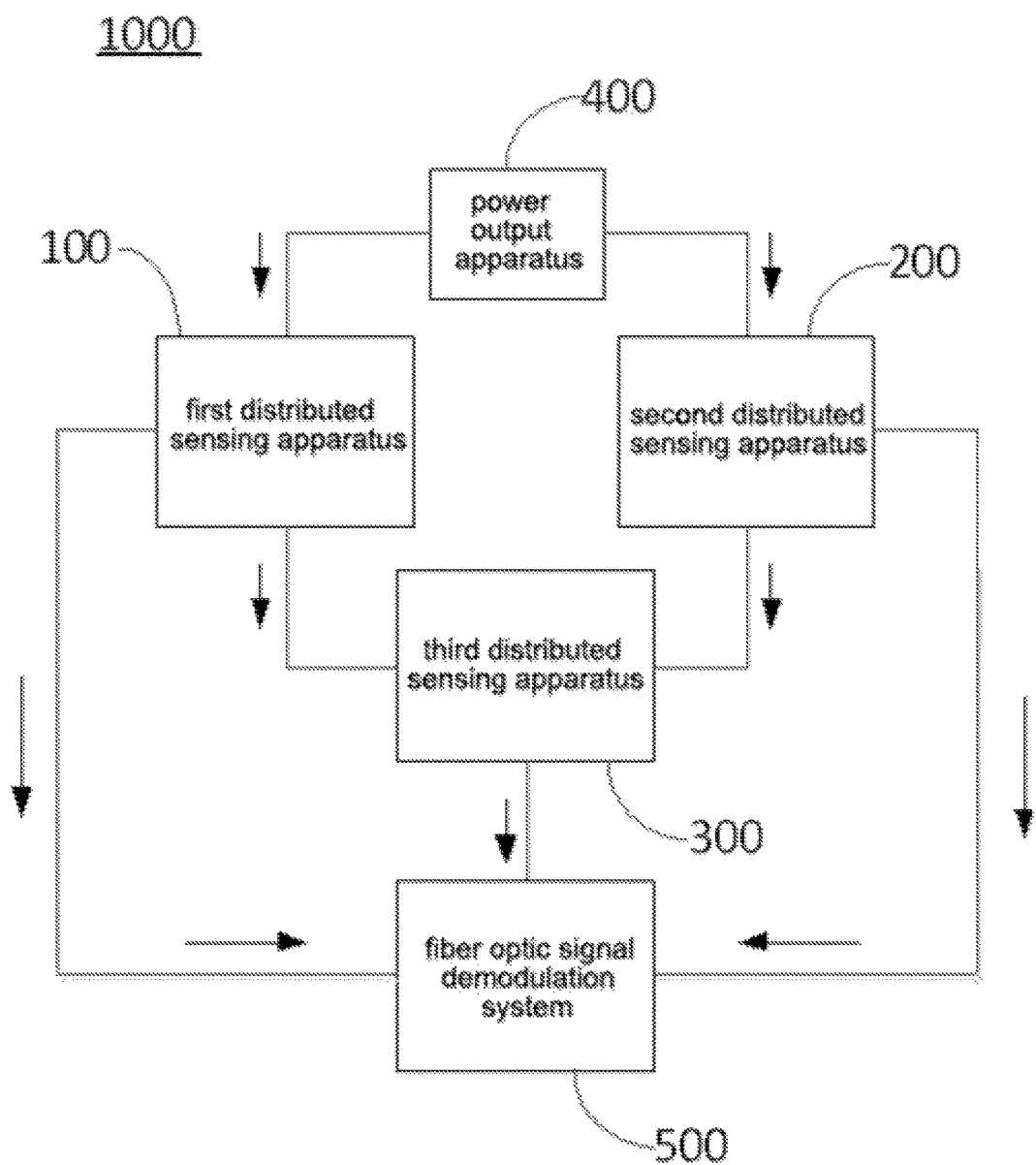
FIG. 8 is a schematic view of a fiber optic acoustic wave detection system provided by a third embodiment of the present invention.

Referring to FIG. 8, the present embodiment provides a fiber optic acoustic wave detection system 1000, which comprises a first distributed sensing apparatus 100, a second distributed sensing apparatus 200, a third distributed sensing apparatus 300, a power output apparatus 400, and a fiber optic signal demodulation system 500. The first distributed sensing apparatus 100 and the second distributed sensing apparatus 200 are connected with the power output apparatus 400, respectively. The first distributed sensing apparatus 100 and the second distributed sensing apparatus 200 are connected with the third distributed sensing apparatus 300, respectively. And, the first distributed sensing apparatus 100, the second distributed sensing apparatus 200 and the third distributed sensing apparatus 300 are connected with the fiber optic signal demodulation system 500, respectively. The biggest difference from the first embodiment and the second embodiment of the present invention is that, individual detection signals carrying the information on the acoustic wave in the measured space, outputted by the first distributed sensing apparatus 100, the second distributed sensing apparatus 200 and the third distributed sensing apparatus 300, are finally inputted into the fiber optic signal demodulation system 500.

The backward Rayleigh scattered signal outputted by the first distributed sensing apparatus 100 enters the fiber optic signal demodulation system 500, and after related processing such as level-difference superposition, etc., a position signal of the measured acoustic wave can be obtained. The backward weak optical fiber grating reflected signal outputted by the second distributed sensing apparatus 200 enters the fiber optic signal demodulation system 500, where phase information of the acoustic wave at a sensing optical fiber between the respective optical fiber gratings in the second detection optical fiber can be demodulated from the light intensity information at a specific position in the measured space. The third detection signal outputted by the third distributed sensing apparatus 300 enters the fiber optic signal demodulation system 500, where the frequency and phase information of the acoustic wave can be demodulated just by performing a 3×3 passive phase demodulation or a phase generated carrier demodulation of the difference in internal devices of the third distributed sensing apparatus 300, without a complicated time division multiplexing system.

As described above, the fiber optic acoustic wave detection system provided by the embodiments of the present invention acquires a backward Rayleigh scattered signal carrying position information of an acoustic wave in the measured space, i.e., the backward Rayleigh scattered signal by the first distributed sensing apparatus 100, acquires a backward weak grating reflected signal carrying light intensity information and acoustic wave phase information at a specific position in the measured space, i.e., the backward weak optical fiber grating reflected signal by the second distributed sensing apparatus 200, and then performs a normalized demodulation scheme on the backward Rayleigh scattered signal and the backward weak optical fiber grating reflected signal acquired by the fiber optic signal demodulation system 500, thereby greatly improving the signal contrast and sensitivity of the whole fiber optic acoustic wave detection system. Meanwhile, the first forward pulse signal emitted from the first distributed sensing apparatus 100 and the second forward pulse signal emitted from the second distributed sensing apparatus 200 are subjected to a passive phase demodulation scheme by the third distributed sensing apparatus 300, which significantly widens the detection bandwidth of the system.

Compared with conventional approaches, the fiber optic acoustic wave detection system provided by the embodiments of the present invention has high capacity, a high multiplexing rate, and high technical indexes such as detection distance, spatial resolution and so on. In addition, the fiber optic acoustic wave detection system provided by the embodiments of the present invention includes a detection principle requiring no time-division multiplexing technology, thus greatly reducing the number of the prior single acoustic wave phase sensors required under the premise of not increasing the length of the sensing optical fiber, reducing the complexity of the system and the technical difficulty in implementation of the system, and greatly reducing system cost. The above are merely preferred embodiments of the present invention and not intended to limit the present invention, and it would be understood by those skilled in the art that various modifications and variations can be made to the present invention. Any modifications, equivalent alternations, and improvements made without departing from the spirit and principle of the present invention should fall within the protection scope of the present invention.

The invention claimed is:

1. A fiber optic acoustic wave detection system, comprising:
    a power output apparatus;
    a first distributed sensing apparatus based on a backward Rayleigh scattering principle;
    a second distributed sensing apparatus based on a backward weak optical fiber grating reflection principle; and
    a third distributed sensing apparatus,
    wherein the first distributed sensing apparatus and the second distributed sensing apparatus are connected with the power output apparatus, respectively,
    the first distributed sensing apparatus and the second distributed sensing apparatus are connected with the third distributed sensing apparatus, respectively,
    a pulse signal outputted by the power output apparatus enters the first distributed sensing apparatus and is partly returned to form a backward Rayleigh scattered signal, outputted from the first distributed sensing apparatus, and partly passes through to form a first forward pulse signal,
    a pulse signal outputted by the power output apparatus enters the second distributed sensing apparatus and is partly returned to form a backward weak optical fiber grating reflected signal, outputted from the second distributed sensing apparatus, and partly passes through to form a second forward pulse signal,
    the first forward pulse signal and the second forward pulse signal pass through the third distributed sensing apparatus to form a third detection signal, and
    the third detection signal is outputted by the third distributed sensing apparatus.

2. The fiber optic acoustic wave detection system according to claim 1, wherein:
    the power output apparatus comprises a laser, an acousto-optic modulator, a first optical amplifier, a first optical filter, and a first coupler,
    the first distributed sensing apparatus and the second distributed sensing apparatus are optically coupled with the first coupler, respectively, and
    an optical signal, outputted by the laser, successively passes through the acousto-optic modulator and the first optical amplifier, and is outputted from the first coupler to the first distributed sensing apparatus and the second distributed sensing apparatus, respectively.

3. The fiber optic acoustic wave detection system according to claim 1, wherein:
    the first distributed sensing apparatus comprises a first detection optical fiber, a first circulator, a second optical amplifier, and a first photoelectric detector,
    the pulse signal outputted by the power output apparatus enters the first detection optical fiber via the first circulator, is partly returned to form the backward Rayleigh scattered signal, and partly passes through to form the first forward pulse signal,
    the backward Rayleigh scattered signal successively passes through the first circulator and the second optical amplifier and is received and outputted by the first photoelectric detector, and
    the first forward pulse signal is outputted to the third distributed sensing apparatus.

4. The fiber optic acoustic wave detection system according to claim 1, wherein:
    the second distributed sensing apparatus comprises a second detection optical fiber, a second circulator, a second optical filter, and a second photoelectric detector,
    the pulse signal outputted by the power output apparatus enters the second detection optical fiber via the second circulator, is partly returned to form the backward weak optical fiber grating reflected signal, and partly passes through to form the second forward pulse signal,
    the backward weak optical fiber grating reflected signal successively passes through the second circulator and the second optical filter, and is received and outputted by the second photoelectric detector, and
    the second forward pulse signal is outputted to the third distributed sensing apparatus.

5. The fiber optic acoustic wave detection system according to claim 1, wherein:
    the third distributed sensing apparatus comprises a second coupler, a third optical filter, a third circulator, an optical fiber interference device, and a photoelectric detection device, the first distributed sensing apparatus and the second distributed sensing apparatus are optically coupled with the second coupler, respectively, the first forward pulse signal outputted by the first distributed sensing apparatus and the second forward pulse signal outputted by the second distributed sensing apparatus successively pass through the third optical filter and the third circulator via the second coupler, enter into the optical fiber interference device, and is partly returned to form the third detection signal, and the third detection signal is received and outputted by the photoelectric detection device.

6. The fiber optic acoustic wave detection system according to claim 5, wherein:

the optical fiber interference device comprises a 3×3 coupler, a first Faraday rotating mirror and a second Faraday rotating mirror, the photoelectric detection device comprises a third photoelectric detector, a fourth photoelectric detector, and a fifth photoelectric detector, the first forward pulse signal and the second forward pulse signal, which have passed through the third circulator, enter the 3×3 coupler, is partly outputted by the 3×3 coupler and reflected back by the first Faraday rotating mirror into the 3×3 coupler, and partly outputted by the 3×3 coupler and reflected back by the second Faraday rotating mirror into the 3×3 coupler, to form the third detection signal in the 3×3 coupler, and the third detection signal is outputted by the 3×3 coupler, and partly passes through the third circulator, is received and outputted by the third photoelectric detector, is partly received and outputted by the fourth photoelectric detector, and is partly received and outputted by the fifth photoelectric detector.

7. The fiber optic acoustic wave detection system according to claim 5, wherein:

the optical fiber interference device comprises a 2×2 coupler, a third Faraday rotating mirror, a fourth Faraday rotating mirror, and a phase modulator, the photoelectric detection device comprises a sixth photoelectric detector, the first forward pulse signal and the second forward pulse signal, which have passed through the third circulator, enter the 2×2 coupler, and is partly outputted by the 2×2 coupler, reflected back by the third Faraday rotating mirror into the 2×2 coupler, is partly is outputted by the 2×2 coupler, passes through the phase modulator, is reflected by the fourth Faraday rotating mirror, and then returned back through the phase modulator into the 2×2 coupler to form the third detection signal in the 2×2 coupler, and the third detection signal is outputted by the 2×2 coupler, and received and outputted by the sixth photoelectric detector.

8. The fiber optic acoustic wave detection system according to claim 3, wherein the first detection optical fiber is a single-mode optical fiber.

9. The fiber optic acoustic wave detection system according to claim 4, wherein the second detection optical fiber is a single-mode optical fiber comprising at least one weak optical fiber grating.

10. A fiber optic acoustic wave detection system, comprising:

a power output apparatus;

a first distributed sensing apparatus;

a second distributed sensing apparatus;

a third distributed sensing apparatus; and a fiber optic signal demodulation system, wherein the first distributed sensing apparatus and the second distributed sensing apparatus are connected with the power output apparatus, respectively, the first distributed sensing apparatus and the second distributed sensing apparatus are connected with the third distributed sensing apparatus, respectively, the first distributed sensing apparatus, the second distributed sensing apparatus, and the third distributed sensing apparatus are connected with the fiber optic signal demodulation system, respectively, a pulse signal outputted by the power output apparatus enters the first distributed sensing apparatus and is partly returned to form a backward Rayleigh scattered signal, outputted from the first distributed sensing apparatus to the fiber optic signal demodulation system, and partly passes through to form a first forward pulse signal, a pulse signal outputted by the power output apparatus enters the second distributed sensing apparatus, and is partly returned to form a backward weak optical fiber grating reflected signal, outputted from the second distributed sensing apparatus to the fiber optic signal demodulation system, and partly passes through to form a second forward pulse signal, the first forward pulse signal and the second forward pulse signal pass through the third distributed sensing apparatus to form a third detection signal, and the third detection signal is outputted from the third distributed sensing apparatus to the fiber optic signal demodulation system.

* * * * *